United States Patent

Naumburg et al.

[15] 3,672,630
[45] June 27, 1972

[54] FLAP VALVE FOR SUCTION APPARATUS

[72] Inventors: Per Naumburg, Djursholm; Jan Olof Norrman, Solna, both of Sweden

[73] Assignee: AB Centralsug, Johanneshov, Sweden

[22] Filed: April 14, 1970

[21] Appl. No.: 28,414

[30] Foreign Application Priority Data

April 18, 1969 Sweden..................................5544/69

[52] U.S. Cl............................251/149.2, 251/147, 251/303, 285/7
[51] Int. Cl.......................................F16k 1/18, F16l 37/28
[58] Field of Search....................251/149.2, 147, 303; 285/7

[56] References Cited

UNITED STATES PATENTS

| | | | |
|---|---|---|---|
| 2,733,889 | 2/1956 | Mattingly | 251/303 X |
| 3,127,148 | 3/1964 | Collar | 251/149.2 |
| 2,325,820 | 8/1943 | White | 251/149.2 X |
| 586,101 | 7/1897 | Koll | 251/149.2 X |
| 3,432,998 | 3/1969 | Downey et al. | 251/149.2 X |

*Primary Examiner*—William R. Cline
*Attorney*—Spencer & Kaye

[57] ABSTRACT

A valve in a wall- or floor-mounted connection box for connecting suction apparatus to a central suction system, said valve being biased to closing position against the action of the negative pressure prevailing in the system.

4 Claims, 2 Drawing Figures

3,672,630

INVENTORS.
Per Naumburg
Jan Olof Norrman

BY *Spencer & Kaye*

ATTORNEYS.

FLAP VALVE FOR SUCTION APPARATUS

BACKGROUND OF THE INVENTION

The present invention refers to so-called silent valves such as used for connecting various types of suction apparatus, in particular vacuum cleaners but also carpet beaters, floor treating apparatus and the like, to a central suction system.

During recent years central suction systems have been installed to a very great extent, in particular in hospitals and other nursing homes but also in ordinary dwelling and office buildings. Such a central system for dust removal, for example, comprises conduits provided with connection boxes in various rooms, a power driven device for providing the necessary suction and a dust collecting device.

In the construction of such connection boxes it is an essential factor to obtain satisfactory sealing when an apparatus is connected to the connection box, the construction permitting the connection to be performed without causing objectional hissing or fussing sound to be produced by air being sucked into the box past the connector during insertion thereof. It is also important that air is prevented from flowing back from the connection box in case of failure of the vacuum-producing system.

Previously suggested constructions using as a valve element in a connection box a ball normally abutting against a seat and thereby closing a conduit branched from the central suction system are subject to the inconvenience that they require a cavity to be provided laterally of the connection box for receiving the ball when the branch conduit ending at the box is in open connection with an apparatus via a connector inserted into the box. Other known valves that have been suggested for this purpose suffer from the drawback that the valve mechanism interferes with the free area of the inserting passage for the connector in the box, thereby impairing suction conditions. Also, there is a certain risk that dirt may collect within the box on exposed portions of the valve mechanism. Moreover, these known valves in many cases have a length which cause difficulties when they are inserted in walls having a reduced thickness.

Valves of a type here in question are, as a rule, provided with an outer locking cap definitely preventing inspiration of air into the system, for example when the valve provided within the box does not close tightly. However, when the cap is open for the insertion of a connector the valve provided within the box must definitely provide a tight closure, otherwise a very objectionable hissing sound and at worst an undue reduction of the negative pressure in the system may appear. In respect thereto the valves in the box have always been so constructed as to be biased towards closure by the negative pressure prevailing in the system.

SUMMARY OF THE INVENTION

The aforementioned deficiencies are obviated by the provision of a flap valve for closing a connector-inserting passage in a wall- or floor-mounted connection box in relation to a branch conduit belonging to a central suction system or the like and communicating with said box in line with said passage, said flap valve having a valve element positioned within the range of penetration of the connector into the passage and being biased towards a closing position. The valve element is pivotally journalled adjacent the wall of the passage and is biased outwardly against the effect of the reduced pressure prevailing in the passage from the interior of the passage to a final position in closing and sealing abutment to the inner wall of the passage or a seat inserted therein.

It is obvious that in this construction, in order to avoid opening of the valve under the action of the reduced pressure prevailing in the branch conduit, the power with which the valve is biased towards the closing position must be comparatively large. However, practice has shown that this is not a serious disadvantage inasmuch as the range of operation of the spring will be comparatively small when the valve flap is obliquely disposed. On the other hand, the general construction permits such a design of the valve element that in the opening condition it will completely uncover the area of the flow passage thus permitting optimum flow conditions through the box to be obtained. In addition, a construction is obtained occupying but a very short building space.

BRIEF DESCRIPTION OF THE DRAWING

The invention will be explained in greater detail by reference to the enclosed drawing in which.

DESCRIPTION OF THE PREFERRED EMBODIMENT

The main parts of the box are a valve housing 1 inserted into the wall, and a valve plate 2 exposed in the plane of the wall and provided with an annular, outwardly facing seat adapted to be contacted by a corresponding gasket on the inside of a locking cap (not shown) pivotally journalled as at 3.

Figure 1:
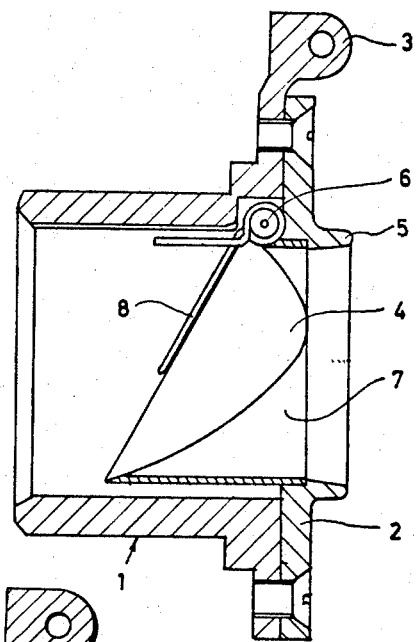
FIG. 1 is a cross-sectional view in elevation of a wall box for connecting an apparatus to a central suction system and including the flap valve of the present invention in a closed position.
Figure 2:
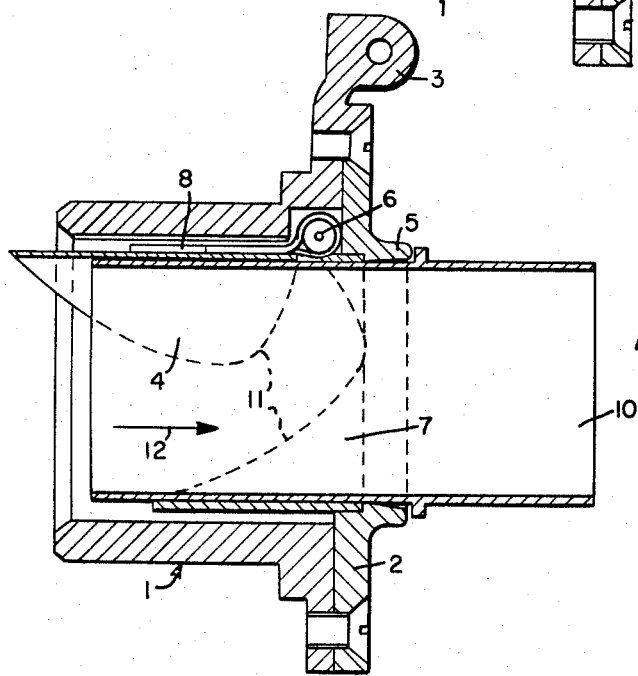
FIG. 2 is a cross-sectional view in elevation of a wall box of FIG. 1 showing the flap valve of the present invention in an open position with a connector tube inserted therein.

A valve element 4 is pivotally supported on a pin 6 within the valve housing 1. On the side of the valve plate 2 facing the valve housing there is provided a seat 7 having a shape complementary to the valve element 4 which is adapted to abut against said seat 7 in an outward direction from the interior of the valve housing 1. The valve element or valve flap 4 is designed as a section of a substantially cylindrical blank the outer diameter of which is substantially equal or possibly slightly larger than the outer diameter of the connector adapted to be inserted into the box through the opening within the annular flange 5 and the seat 7 extending therefrom. That is, the valve flap 4 comprises a surface which forms a cylindrical sector. The length of valve flap 4 from the portion adjacent the pin 6 to the point of abutment against the seat on the side of the flow passage diametrically opposed to pin 6 is greater than the cross-sectional dimension of the passage at the pivot which means that the valve element is in an oblique position from the pivot in an inward direction whereby the valve element presents an inwardly inclined engagement surface to the connector inserted into the box and thereby offers decreased resistance to opening. In order to obtain a closing and sealing abutment of the valve flap 4 against the seat of the valve flap 4 has such a contour that its projection against the cross section of the passage in the closing position of the valve flap is circular with a radius corresponding to the radius of seat 7. In other words, the outline of the edge 11 is circular when viewed in the direction of arrow 12 (FIG. 2), and also curved as shown in the side elevation of FIG. 2. In effect, the edge 11 is generated by the intersection of the cylindrical tube 7 and the cylindrical sector valve flap 4. Due to this construction the valve flap 4 comprises, on the one hand, a back portion extending from the pivot 6 and having a length greater than the diameter of the passage at the pivot, said back portion in the closing position of the valve being in contact with the seat 7 diametrically opposite to the pivot but farther inwardly of the passage than the pivot and in the opening position of the valve extends inwardly of the passage substantially along and adjacent to the passage wall in parallel to the passage axis and, on the other hand, wing portions which in the closed position of the valve extend transversely through the passage into complete abutment against seat 7 and in the opening position of the valve extend substantially in parallel to the passage walls.

The valve flap is biased to closing position by means of a spring 8, which is wound about pivot pin 6 and the free end of which from the interior of the passage abuts against the back portion of the valve flap 4 whereas the other end of the spring is supported against the inner wall of valve housing 1.

When a cylindrical connector 10 (FIG. 2) is inserted through the annular flange 5 and seat 7 the edge of the connector will come into contact with the valve flap at its upper end near pivot pin 6, the flap during continued insertion of the connector being pivoted about pin 6 towards a final position in which it is positioned concentrically between housing 1 and the connector 10 inserted therein.

The diameter of the connector 10 corresponds to the width of the opening in the annular flange 5 and seat 7 with such an exactitude that scarcely any air will penetrate into the passage around the outer surface of the connector during the opening of the valve flap due to the insertion of the connector. The connector may be provided on its outer surface with an annular gasket which in the position of extreme insertion abuts against annular flange 5 and thereby prevents air from entering about the outer surface of the connector even if the connector is exposed to laterally directed pulling tension.

When the connector 10 is fully inserted into the box no part of the valve mechanism extends into the air flow passage beyond the free end of the connector.

The valve mechanism as described is an effective means for preventing, for example, contaminated air from penetrating into the room through the connection box in case the suction system is out of function and a state of positive pressure is prevailing in the suction system. Under normal operating contions, as soon as the valve flap has become lifted from the seat during insertion of the connector the suction effect will assist in lifting the valve flap from the seat against the action of the biasing spring.

What we claim is:

1. A valve for the connection box of a central suction system adapted to close a connector-inserting longitudinal passage in the box, said valve comprising:
   a. a valve flap formed of a substantially cylindrical surface segment having a back portion which exceeds in length the diameter of the passage;
   b. means for mounting said valve flap to the box for pivotal movement within the passage about one end of the back portion;
   c. a valve seat having a substantially cylindrical section for insertion in the passage;
   d. said valve flap segment and said valve seat section having mating curved edges which coincide when said valve flap is in the closed position to provide a seal;
   e. means for biasing said valve flap into a closing position against the atmospheric pressure externally of the box to thereby retain a subatmospheric pressure in the interior of the box, said valve flap back portion in its closed position being inclined to the longitudinal axis of the passage and in its open position being substantially parallel to the surface defining the passage.

2. A valve as defined in claim 1, wherein said surface of said valve flap forms a sector of a cylindrical tube the outer diameter of which is at most equal to the inner diameter of the passage, said sector having such a contour that its projection against the cross section of the passage in the closing position of the valve is circular.

3. A valve as defined in claim 2 wherein the inner diameter of the cylindrical tube is at least as large as the outer diameter of the connector which is inserted within said passage.

4. A valve as defined in claim 2, wherein said curved edges form the intersection of the cylindrical valve seat and the cylindrical sector valve flap.

* * * * *